United States Patent [19]

Frank

[11] 4,218,519

[45] Aug. 19, 1980

[54] CONFIGURATION FOR A GAS REDOX FUEL CELL EMPLOYING AN ION EXCHANGE MEMBRANE

[75] Inventor: Steven N. Frank, McKinney, Tex.

[73] Assignee: Texas Instruments Incorporated, Dallas, Tex.

[21] Appl. No.: 938,749

[22] Filed: Sep. 1, 1978

[51] Int. Cl.² .......................................... H01M 8/04
[52] U.S. Cl. ...................................... 429/15; 429/17
[58] Field of Search ................. 429/15, 14, 17, 30, 429/27–29, 40, 46, 105, 107

[56] References Cited

U.S. PATENT DOCUMENTS

| | | | |
|---|---|---|---|
| 2,921,110 | 1/1960 | Crowley et al. | 429/29 |
| 3,124,520 | 3/1964 | Juda | 429/40 X |
| 3,152,013 | 10/1964 | Juda | 429/40 |
| 3,440,102 | 4/1969 | Holt | 429/15 |
| 3,525,643 | 8/1970 | Spahrbier et al. | 429/15 |

*Primary Examiner*—Charles F. Lefevour
*Attorney, Agent, or Firm*—William E. Hiller; Andrew M. Hassell; Rene' E. Grossman

[57] ABSTRACT

An improved fuel cell having an inter-electrode electrolyte chamber and wherein provision is made for periodically or continuously extracting impure electrolyte from the chamber and replacing it with relatively pure electrolyte.

9 Claims, 5 Drawing Figures

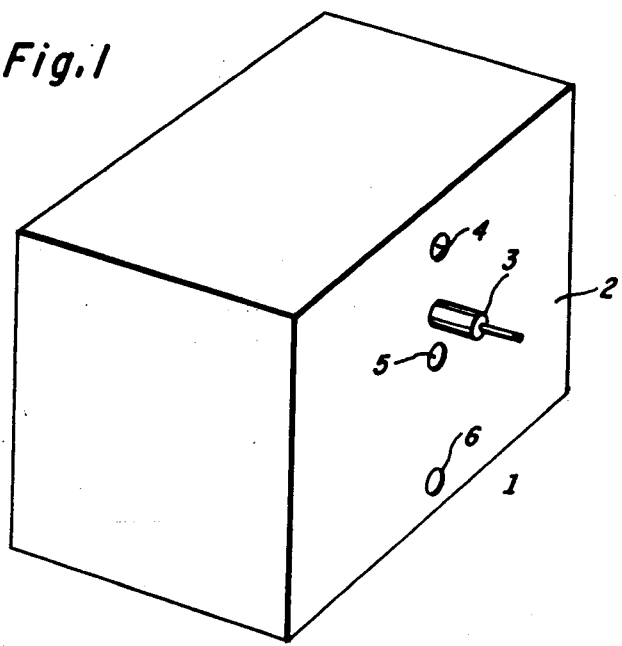
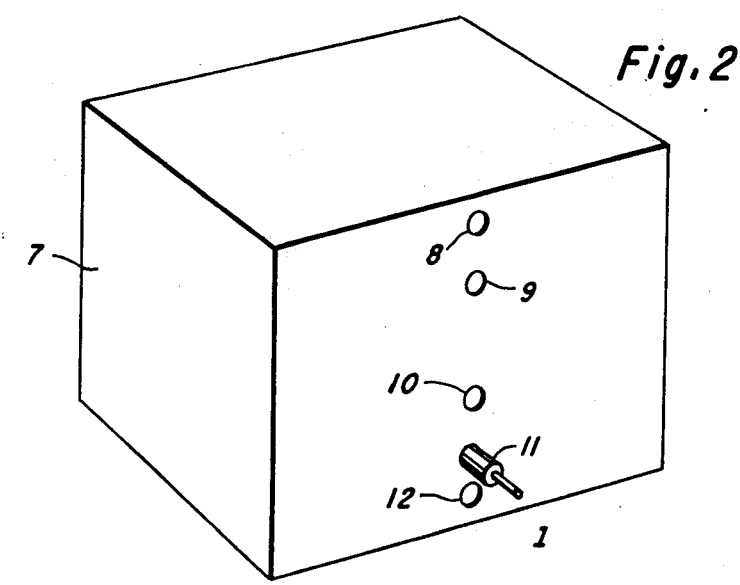

CONFIGURATION FOR A GAS REDOX FUEL CELL EMPLOYING AN ION EXCHANGE MEMBRANE

This invention relates to fuel cells and more particularly to cells of the gas redox type employing ion exchange membranes.

Fuel cells of the foregoing type have heretofore been proposed, illustrative of which are those described in U.S. Pat. No. 3,152,013 granted to Walter Juda on Oct. 6, 1964, and in an article "Performance of Hydrogen-Bromine Fuel Cells" by Werner Glass and G. H. Boyle which was published in a collection entitled "Fuel Cell Systems" by the American Chemical Society in 1965. However, there existed within such fuel cells a number of problems which centered about the electrical conductivity of certain of the constituent members and their relationship to conditions involving the ion exchange membrane.

As is known by those skilled in the art, a fuel cell is a device with generally stationary parts which, nevertheless, is effective to produce electrical currents in response to the introduction of selected gaseous or liquid reactants. One typical class of such reactants is hydrogen gas and the halogens dissolved in the corresponding halide acid, e.g. chlorine dissolved in hydrogen chloride, bromine dissolved in hydrogen bromide and iodine in hydrogen iodide. In practice, hydrogen gas and one of the halogens (the latter existing molecularly) are separately introduced to the fuel cell. Therein, the hydrogen molecules give up electrons to an electrical circuit and the halogens accept electrons from the electrical circuit. Thus, the hydrogen molecules become positively charged ions and the halogen molecules become negatively charged ions in equal number, a necessary condition for equilibrium within the solution.

A simple form of fuel cell is a pair of electrodes with an ion exchange membrane therebetween. In practice, it will be evident that fuel cell efficiencies depend in part on internal resistance. This manifests itself in two areas: (1) resistance to the flow of electrons in the electrodes; and (2) the resistance to flow of the ions of the electrolyte. A major contributor to the latter is the ion exchange membrane. Since the achievement of desirable efficiencies is directly related to these two considerations, there have been continuing efforts to reduce internal electrical resistance and improve membrane transport efficiencies in order to achieve commercially attractive configurations.

From the foregoing, it will be evident that desiderata include minimizing internal electrical resistance within the electrodes where oxidation and reduction occur, optimizing catalytic efficiency in bringing about the aforesaid oxidation or reduction, and maximizing effectiveness of the ion exchange membrane, i.e., selectivity and conductivity. However, certain of these tend to work at cross purposes with each other as, for example, where minimizing electrical resistance tends toward increasing thickness of the porous electrodes and where increase in thickness generally results in longer paths of travel for the active ingredients through the pores thus resulting in a greater pressure drop therethrough.

The importance of the ion exchange membrane centers around its ability to pass ions of a given charge type only. Theoretically, a perfect membrane would be one in which there would be no resistance to flow therethrough of ions of one charge type, while exhibiting infinite resistance to flow of ions of the other type. This, in a fuel cell, would result in a membrane in which there would be no forward resistance and no reverse flow, e.g., unimpeded passage of cations in one direction and no passage of anions in the other. However, in practice, it has been found that presently known materials are not completely unidirectional and that when membranes are made sufficiently thin and porous to permit good transport efficiencies for desired ions (i.e., low flow resistance), there is significant reverse flow therethrough of ions of the other charge type, e.g., for a cation exchange membrane, an unwanted reverse flow of anions.

The aforementioned reverse flow is especially undesirable because it results in a marked reduction of the catalytic efficiency of the electrode in the chamber into which such reverse flow enters, particularly in configurations employing porous gas electrodes with oxygen or hydrogen. For this reason, it has been found that in fuel cells of the type herein described, there is a reduction in efficiency with the passage of time.

It is one general object of this invention to improve fuel cells.

It is another object of this invention to enhance efficiencies in fuel cells of the gas redox type.

It is still another object of this invention to provide for cell regeneration either continuously or at selected intervals, thereby preventing significant deterioration in fuel cell characteristics.

It is still a further object of this invention to provide configurations having low internal electrical resistance and high catalytic conversion efficiencies.

Accordingly, in accordance with one feature of the invention, provisions are made for chambers into which beneficial fluids are introduced, thereby tending to reduce contamination effects of the aforementioned reverse flow.

In accordance with another feature of the invention, provisions are made for regeneration or replacement of the aforementioned fluids thereby to purge any undesired constituents therein resulting from said reverse flow.

In accordance with still another feature of the invention, the geometries of the anode and cathode electrodes are chosen so as to provide enhanced electrochemical characteristics while maintaining relatively low electrical resistance.

These and other objects and features of the invention will be observed from the following detailed description, by way of example, with reference to the drawing in which:

FIG. 1 is a front perspective view of a fuel cell in accordance with the invention;

FIG. 2 is a rear perspective view of a fuel cell in accordance with the invention;

Figure 3:
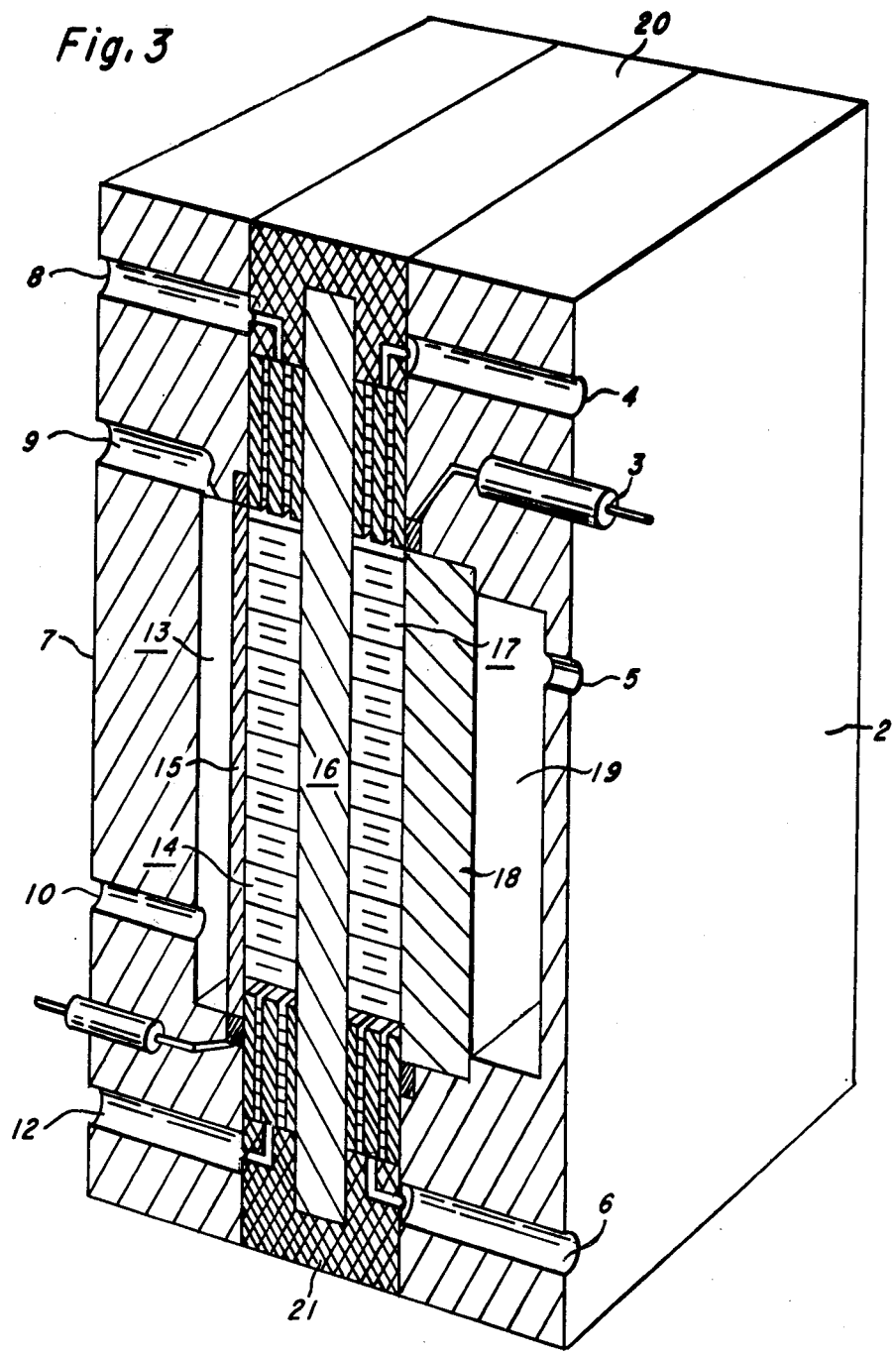
FIG. 3 is a cutaway section showing the internal construction of the cell of FIGS. 1 and 2.

Now referring more particularly to the drawings, it will be observed that in FIG. 1 there is depicted a portion of the front exterior of fuel cell 1 showing right side 2, a positive electrode 3 exiting through the side of surface 2, reacted solution outlet 4, reactive solution inlet 5, and an other reacted solution outlet 6.

In FIG. 2 there is depicted a generally rear view of the fuel cell 1 showing at symbol 7 the side opposite to that of side 2 and further depicting negative electrode 11, flush electrolyte outlet 8, upper hydrogen gas inlet/outlet 9, lower hydrogen gas outlet/inlet 10 and flush electrolyte inlet 12.

FIG. 3 depicts a cutaway view patterned after FIG. 1 and wherein parts shown in FIGS. 1 and 2 are identified with like symbols. In addition to those parts hereinabove identified, FIG. 3 depicts hydrogen gas chamber 13 which communicates with hydrogen gas upper and lower orifices 9 and 10; electrolyte cavity 14; wall member 7 which forms one wall of the cell exterior and which further defines one dimension of cavity 13; porous hydrogen anode 15 which further defines another wall of said cavity 13 and additionally a wall of cavity 14; and ion exchange membrane 16 which further defines a wall of said cavity 14.

Further reference to FIG. 3 reveals the existence of electrolyte cavity 17 bounded at one side by cation (when using hydrogen) exchange membrane 16 and on the other side by porous solution flowthrough electrode 18. Cavity 17 communicates with the exterior via reacted solution outlet 6 and reacted solution outlet 4.

Also included are reactive oxidant solution inlet chamber 19 bounded on one side by porous solution flowthrough electrode 18 and on the other side by the exterior wall 2 of the fuel cell 1. Provision is made for communicating with inlet chamber 19 via reactive solution inlet 5.

Also depicted are spacers 20 and 21 which may be of any suitable material having electrical and corrosion resistance properties compatible with the electrolytes and oxidants selected for utilization in the cell.

When in operation, cavity 14 contains a suitable electrolyte as, for example, a solution of sulfuric acid at an approximate concentration of two molar. Such solution provides for efficient transport of the hydrogen ions required for efficient operation. Hydrogen gas is introduced to chamber 13 via either or both of ports 9 and 10, and a liquid reactive solution containing a redox couple such as a halide and halogen is introduced to chamber 19 via inlet port 5. This liquid reactive solution passes through porous electrode 18 into cavity 17 and is exhausted through port 4 and/or 6. (Of course, it will be evident to those skilled in the art that the solution may pass through electrode 18 in the reverse direction.) When these conditions exist, hydrogen molecules diffuse through porous hydrogen anode 15 where they give up electrons and become ionized. They then pass through electrolyte 14 and cation exchange membrane 16 into the solution within chamber 17 where they maintain ionic charge balance with the then ionized halide which has passed through porous electrode 18 and, in so doing, accept electrons therefrom. Reaction products from chamber 17 are exhausted through outlets 4 and/or 6.

As mentioned above, if cation exchange membrane 16 were perfect, operation of the cell would be expected to continue without significant performance degradation. However, there are small reverse flows of anions (such as $Cl^-$, $Br^-$, $I^-$) from the solution within cavity 17 into cavity 14. These are effective to poison the porous hydrogen anode 15 and to reduce its effectiveness in converting electrically neutral hydrogen to hydrogen ions. As this progresses, the efficiency of the fuel cell decreases and, unless reversed, reduces the cell to unacceptable levels of performance.

In accordance with the invention hereof, it has been discovered that periodic flushing or extraction of the electrolyte within chamber 14 promptly restores the cell to its former effectiveness. Such flushing may be exceedingly brief and does not result in interruption of cell power output. Moreover, as an alternative, flushing may be continuously employed at a controlled rate in order to prevent the development of the aforementioned performance degradation. Thus, in consequence of the foregoing, the cell may achieve improved efficiencies through reduction in internal resistance and improved ionic transport.

The contamination of platinum by halogen ions is widely believed to be an irreversable process and, at best to be a slow equilibrium process. Also, very low concentrations of halides can result in significant contamination of platinum surfaces. Unexpectedly, it has been found that in accordance with the present invention, such contamination is substantially reversible and the equilibrium kinetics rapid enough that significant benefit results from the flush system.

In the example of a hydrogen-redox fuel cell during extended operation, the anolyte flush may gradually diffuse through the ion exchange membrane and contaminate the catholyte, resulting in a depletion of the anolyte flush and dilution of the catholyte. For certain anolyte-catholyte mixtures, separating a relatively small amount of anolyte flush material from the catholyte is exceedingly difficult and complex. This can be avoided by employing a catholyte that already contains the same concentration (strictly speaking, the same activity which accounts for non-ideal behavior) of anolyte flush material as the pure anolyte itself. In this way no concentration gradient of anolyte exits between the two sides of the ion exchange membrane to act as a driving force for diffusion. In the example of the hydrogen-halogen fuel cell, the driving force during operation with equal anolyte flush material concentrations activities on both sides of the membrane will be such as to remove anolyte from the catholyte and concentrate the anolyte flush. In this case, however, some of the concentrated anolyte flush can be added to the catholyte to reestablish equal anolyte concentrations on both sides of the ion exchange membrane, greatly simplifying the fuel cell system.

EXAMPLE 1

A fuel cell was constructed according to FIGS. 1-3. A Nafion 125 membrane obtained from E. I. duPont was employed as a cation exchange membrane. The nominal thickness of this membrane was 5 mils. Twenty mil Teflon spacers were used to form cavities 14 & 17. The porous hydrogen anode was prepared using a 10-13 mil graphite paper substrate onto which was deposited a catalyst layer composed of $-325$ mesh graphite powder, platinum black, and Teflon particles. Electrical contact was made to the graphite paper by a porous molybdenum plate. The platinum loading was 0.7 mg/cm$^2$. The cathode was composed of a porous graphite felt material of nominal thickness of 100 mils. Contact to the cathode was made with a porous tantalum plate. The projected surface areas of the anode and cathode were 16 square inches. Hydrogen gas was supplied to the anode through inlet 9 at a rate greater than required by the current drawn by the fuel cell with the excess exiting through outlet 10. Sulfuric acid of 2 Molar concentration was flowed through cavity 14 at 15 milliliters/min. The cathode was supplied with a solution of 1 Molar bromine in 48% HBr at a rate greater than required by the fuel cell current load.

The open circuit voltage of this fuel cell was 0.78 V.

At a voltage efficiency of 0.7 the power density of the fuel cell was 77 watts per square foot.

Figure 4:
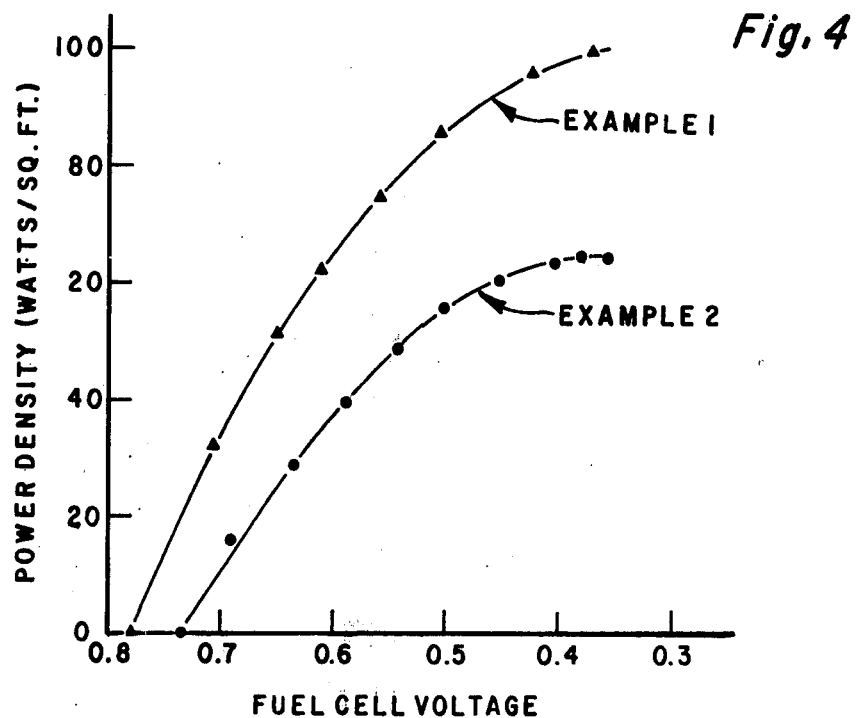
FIG. 4 is a graph depicting voltage/power density characteristics of certain cells embodying the principles of the invention.

The power-voltage characteristic is shown in FIG. 4.

EXAMPLE 2

A fuel cell was set up and operated as in Example 1. Instead of a continuous flush of 2 M $H_2SO_4$ in cavity 14, the cavity was flushed with 48% HBr.

The open circuit voltage was 0.73 volts.

At a voltage efficiency of 0.7 the power density of the fuel cell was 54 watts per square foot. The power-voltage characteristic is shown in FIG. 4.

As can be seen from Examples 1 and 2, significantly greater power densities result with 2 M $H_2SO_4$ in cavity 14 than with 48% HBr. Additionally, in the case of Example 1 when the rate of flow of 2 M $H_2SO_4$ in cavity 14 was decreased to zero, the voltage at a given current rapidly decayed with time due to reverse flow of bromide anions and bromine through the Nafion 125 membrane. The original power-voltage characteristic was restored when the flow of 2 M $H_2SO_4$ in cavity 14 was resumed. Additionally, in the case of Example 2 when the flow of HBr in cavity 14 was decreased to zero, the voltage also underwent a decay with time due to transport to bromine molecules through the Nafion membrane and continued poisoning due to bromideions. In the case of Example 2 when the 48% HBr flow in cavity 14 was replaced with a 2 M $H_2SO_4$ flow, the power-voltage characteristic of Example 1 was obtained after several minutes.

EXAMPLE 3

A 1 square inch fuel cell was assembled and operated as in Examples 1 and 2. However, instead of flowing 1 M bromine in 48% HBr through the cathode, the oxidant was a solution of 1 M $Fe^{+2}$ and 1 M $Fe^{+3}$ in 3 M HCl. Also, a Nafion 120 membrane was employed instead of Nafion 125.

The open circuit voltage of this fuel cell was 0.59 V.

At a voltage efficiency of 0.7 the power density was 36 watts per square foot.

In the absence of $H_2SO_4$ flow in cavity 14, the voltage at a given current slowly degraded with time. In 17 minutes, power density decreased from 36 to 32 watts per square foot. On resumption of the $H_2SO_4$ flow, the original power-voltage characteristic was restored.

EXAMPLE 4

A fuel cell as in Example 3 was operated with 0.02 M $I_2$, 0.5 M KI and 2 M $H_2SO_4$ supplied to the cathode.

The open circuit voltage of this fuel cell was 0.47 V.

The power density at 0.7 voltage efficiency was 15 watts per square foot.

In the absence of $H_2SO_4$ flow in cavity 14 the power density of this fuel cell declined precipitously. Resumption of flow of of $H_2SO_4$ resulted in rapid restoration of the cell to its initial state of efficiency, and continued flow of $H_2SO_4$ in cavity 14 prevented further decline of fuel cell power density.

EXAMPLE 5

Figure 5:
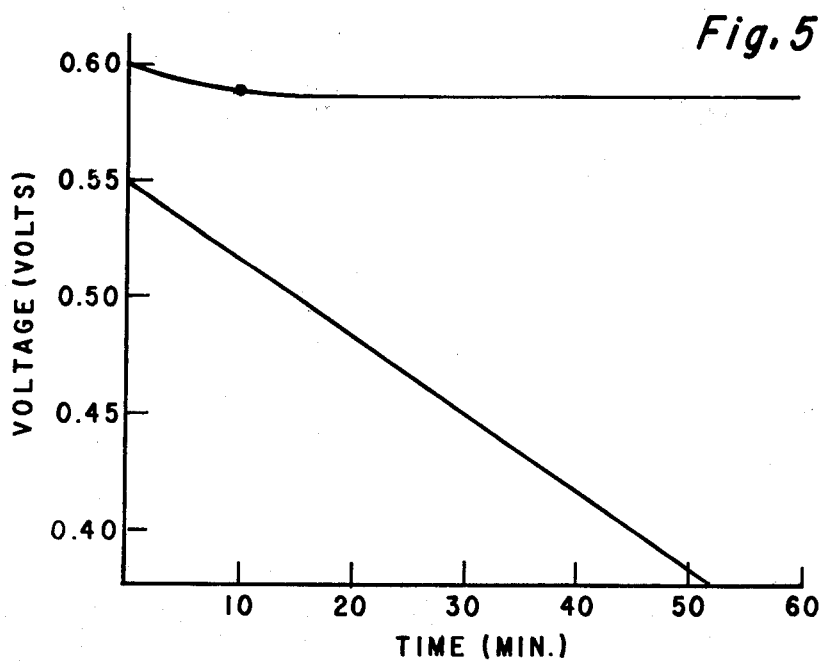
FIG. 5 is a graphical depiction of the cell voltage vs. time for one example of the invention.

A fuel cell was assembled as in Example 1. Cavity 14 was alternately flushed with 2 M $H_2SO_4$ and 48% HBr at 14 ml/min. The voltage as a function of time was recorded at a current density of 99 A/SF. The oxidant was 1 M $Br_2$/6.9 M HBr. The voltage time behavior is shown in FIG. 5. As depicted in the figure, after a small initial voltage decay the voltage at constant current was nearly constant with time in the case of $H_2SO_4$ flush but decreased monotonically with time with an HBr flush.

EXAMPLE 6

A fuel cell was assembled as in Example 1 and operated in such a manner that the power density at 0.7 voltage efficiency was 62 W/SF. The open circuit voltage was 0.78 V. The 1 M $Br_2$/48% HBr oxidant was replaced with 1 M $Br_2$/6.9 M HBr/2 M $H_2SO_4$ and the fuel cell again operated. The power density at 0.7 voltage efficiency was 57 W/SF and the open circuit voltage again was 0.78 V.

It is desirable that the anode and cathode cavities be exceedingly thin, otherwise unacceptable losses due to electrical resistance of the electrolyte result. It was not at all certain that a flush as described above could be carried out with sufficient flow velocities to be effective without an unacceptable pressure increase in the narrow flush cavity resulting in the flush electrolyte being forced through the porous anode into the hydrogen gas cavity.

It was also not evident that the flush flow pattern or mixing efficiency would be effective enough to remove impurities throughout the cavity.

A possible additional complication with thin anode and cathode electrolyte chambers was that with different anolyte and catholyte flow rates the ion exchange membrane might be forced into physical contact with either the anode or cathode electrodes resulting in either a decrease in the electrolyte flush efficiency or less efficient catholyte flow within the cathode. Unexpectedly, in accordance with the examples hereinbefore described, the above complications were advantageously overcome.

It will now be observed that through the efficacious practice of the hereinabove described inventive concepts, marked improvements result, thus contributing to the attractiveness of the fuel cells in commercial embodiments.

Although the aforementioned description illustrates the invention as involving the use of hydrogen gas and redox couples, and although further it is described by reference to specific electrolytes and electrode materials, it will be evident to those skilled in the art that others could readily be employed without departing from the scope and principles of the invention.

The words and expressions employed are intended as terms of description and not of limitation, and there is no intention in the use thereof of excluding any equivalents, but on the contrary, it is intended to include any and all equivalents, adaptation, and modifications that may be employed without departing from the spirit and scope of the invention.

What is claimed is:

1. In a fuel cell for providing an electrical current in response to the electrochemical reactions of oxidants and reductants, and wherein said cell contains an anode, a cathode, and an ion exchange membrane disposed between a first electrolyte-containing chamber and a second electrolyte-containing chamber, the improvement comprising removing from the first electrolyte-containing chamber impurity-containing electrolyte therein while maintaining said impurity-containing electrolyte separate from the electrolyte of said second electrolyte-containing chamber, and replacing the removed electrolyte with essentially pure electrolyte.

2. The fuel cell according to claim 1 in which the removal occurs continuously.

3. The fuel cell according to claim 1 in which the removal occurs at spaced intervals.

4. In a fuel cell for providing an electrical current in response to the electrochemical reactions of an oxidant and reductant, wherein said cell contains an anode, a cathode, and an ion exchange membrane therein forming an anode electrolyte compartment and a cathode electrolyte compartment, the improvement comprising removing the electrolyte from the anode compartment while maintaining said electrolyte separate from the electrolyte of the cathode electrolyte compartment and removal of undesirable species of ions and molecules from the anode, and refilling the anode compartment with fresh uncontaminated electrolyte.

5. The fuel cell according to claim 4 in which said removing occurs continuously.

6. The fuel cell according to claim 4 in which said removing occurs at spaced intervals.

7. In a fuel cell for providing an electrical current in response to the electrochemical reactions of oxidants and reductants, and wherein said cell contains an anode, a cathode and an ion exchange membrane disposed between a first electrolyte-containing chamber and a second electrolyte-containing chamber, the improvement comprising replacing the electrolyte within said first electrolyte-containing chamber while maintaining said electrolyte separate from the electrolyte of said second electrolyte-containing chamber and purifying the replaced electrolyte for reintroduction to said first electrolyte-containing chamber.

8. The fuel cell according to claim 7 in which said replacing occurs continuously.

9. The fuel cell according to claim 7 in which said replacing occurs at spaced intervals.

* * * * *